United States Patent
Kurasawa et al.

(12)

(10) Patent No.: US 6,495,621 B1
(45) Date of Patent: *Dec. 17, 2002

(54) MOLDING MATERIAL FOR OA MACHINE PARTS WITH IMPROVED VIBRATION DAMPING PROPERTIES

(75) Inventors: Yoshihiro Kurasawa, Hiratsuka (JP); Akihiro Kokubo, Hiratsuka (JP); Koji Nishida, Hiratsuka (JP)

(73) Assignee: Mitsubishi Engineering-Plastics Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/577,773

(22) Filed: May 24, 2000

Related U.S. Application Data

(63) Continuation-in-part of application No. 09/188,622, filed on Nov. 9, 1998, now abandoned.

(30) Foreign Application Priority Data

Nov. 12, 1997 (JP) ............................................. 9-325153
Jun. 25, 1998 (JP) ............................................ 10-178488

(51) Int. Cl.[7] ......................... C08L 71/12; C08L 69/00; C08K 7/14
(52) U.S. Cl. ..................... 524/141; 524/505; 525/92 D; 525/92 E
(58) Field of Search ................................ 524/141, 505; 525/92 D, 92 E

(56) References Cited

U.S. PATENT DOCUMENTS

| | | | | |
|---|---|---|---|---|
| 3,334,154 A | * | 8/1967 | Kim | |
| 4,140,730 A | * | 2/1979 | Binsack | |
| 4,322,507 A | * | 3/1982 | Haaf | |
| 4,946,882 A | * | 8/1990 | Haaf | |
| 5,910,540 A | * | 6/1999 | Takahashi | |

FOREIGN PATENT DOCUMENTS

| | | |
|---|---|---|
| JP | 181552 | 8/1991 |
| JP | 194821 | 8/1993 |
| JP | 202287 | 8/1993 |
| JP | 165998 | 6/1995 |

OTHER PUBLICATIONS

Machine Translation of JP05194821.*

* cited by examiner

*Primary Examiner*—David J. Buttner
(74) *Attorney, Agent, or Firm*—Edwards & Angell, LLP; David C. Conlin; Richard J. Roos

(57) ABSTRACT

The present invention relates to a molding material for OA machine parts, wherein such material comprises a resin combination of 60 to 98 parts by weight of a polyphenylene ether-based resin, 2 to 40 parts by weight of a thermoplastic elastomer, and 1 to 50 parts by weight of a flame retardant, such that the resin composition has a bending modulus of not less than 1500 MPa as measured at 23° C. according to ASTM D790, a damping ratio of not less than 1.0% at 23° C., and a thermal deformation temperature of not less than 100° C. as measured according to ASTM D648 under 18.6 kg/cm² load, and wherein the product of the bending modulus and the damping ratio is not less than 10,000 MPa*%.

7 Claims, 1 Drawing Sheet

MOLDING MATERIAL FOR OA MACHINE PARTS WITH IMPROVED VIBRATION DAMPING PROPERTIES

CROSS REFERENCE TO RELATED APPLICATION

This is a continuation-in-part of application Ser. No. 09/188,622, filed Nov. 9, 1998 now abandoned.

BACKGROUND OF THE INVENTION

The present invention relates to a molding material for OA machine parts with improved vibration-damping properties, particularly it relates to such a molding material comprising a polyphenylene ether-based or polycarbonate-based resin having high mechanical strength, heat resistance and dimensional accuracy.

Since polyphenylene ether-based resins and polycarbonate-based resins have many excellent properties such as high mechanical strength, heat resistance, dimensional stability and flame retardancy, they are popularly used as material of various commercial products in many fields of industry, such as typically electronic parts, electrical apparatus and automobile parts.

Recently, most remarkably, these polyphenylene ether-based and polycarbonate-based resins are used instead of the conventional metals and thermosetting resins, as material of the business machine parts, especially chassis parts of such office machines as copiers and facsimiles, or the chassis parts or trays of the disc drives such as CD-ROM drive, DVD, FDD, HDD, etc., used in personal computers. This owes to the excellent properties such as high mechanical strength, heat resistance, dimensional accuracy and flame retardancy of the polyphenylene ether-based and polycarbonate-based resins. In applications where high rigidity is required, the reinforced polyphenylene ether or polycarbonate resins containing inorganic fillers are used. Development of these resin materials is also answering to the request for smaller size and thickness of the products in recent years.

Lately, however, there has arisen the problem of vibration incidental to the operational speed-up of the OA machines. Vibrations generated at their source, such as motor in a device, are transmitted to the resin-made parts, especially chassis parts, to let them vibrate, which is liable to result in causing blurring of the image or difficulty in reading data. For instance, the increase of processing speed in the case of copying machines or the increase of rotation speed in the case of disc drives such as CD-ROM drive has boosted the generated frequency to a very high level, such as 1,000 Hz in some cases, in contrast with the frequency of up to about 200 Hz in the conventional devices.

Because of such elevation of the output frequency, it has now become difficult to hold down vibrations of the chassis parts, in which it has been possible to overcome by increasing thickness or by proper designing of the rib structure in the conventional products. In the resin material, efforts have been made to increase rigidity by blending a greater amount of inorganic filler to raise the resonance frequency, so that the resonance frequency may be left out of the range of generated frequency. However, there is a limitation due to excessive elevation of the generated frequency. As another antivibration means from the resin material, it is suggested to use a material which is capable of absorbing vibrations. However, such vibration-absorbing materials are poor in rigidity and heat resistance, and impracticable for the OA machine parts.

Further, in a resin molding material for OA machine parts, excellent flame-retardant property is required. Usually, the flame-retardant property is evaluated by UL94 test. In a resin molding material for OA machine parts, the flammability of V-0, V-1 or V-2 rank according to UL94 vertical combustion test is required. However, it is difficult for a resin molding material for OA machine parts to satisfy the excellent vibration damping properties and excellent flame-retardant property, simultaneously.

Under these circumstances, there has been desired development of a resin molding material having improved vibration damping properties and flame-retardant property while maintaining high mechanical strength and heat resistance required for the OA machine parts.

As a result of the present inventors' earnest studies to solve the above problem, it has been found that a molding material comprising a polyphenylene ether-based or polycarbonate-based resin composition having a specific modulus of elasticity and damping ratio, is suited for the OA machine parts. The present invention has been attained on the basis of the above finding.

SUMMARY OF THE INVENTION

An object of the present invention is to provide a molding material for OA machine parts which has excellent vibration damping properties and flame-retardant property, by using a polyphenylene ether-based or polycarbonate-based resin with high mechanical strength, heat resistance and dimensional accuracy.

To attain the above aim, in an aspect of the present invention, there is provided a molding material for OA machine parts comprising a resin composition comprising:

(1) 60 to 98 parts by weight of a polyphenylene ether-based resin comprising 10 to 100% by weight of a polyphenylene ether resin and 0 to 90% by weight of a styrene-based resin, or a polycarbonate-based resin comprising 50 to 100% by weight of a polycarbonate resin and 0 to 50% by weight of a styrene-based resin;

(2) 2 to 40 parts by weight of a thermoplastic elastomer which is a conjugated diene rubber having not less than 50% by weight of 1,2-vinyl structure, 3,4-vinyl structure or mixture thereof, a styrene-conjugated diene block copolymer having not less than 50% by weight of 1,2-vinyl structure, 3i4-vinyl structure or mixture thereof, or a hydrogenated product thereof; and (3) 1 to 50 parts by weight of a flame retardant, the total amount of (1) polyphenylene ether-based or polycarbonate-based resin and (2) thermoplastic elastomer being 100 parts by weight, said resin composition having bending modulus of not less than 1500 MPa as measured at 23° C. according to ASTM4 D790, a damping ratio of not less than 1.0% at 23° C., and a thermal deformation temperature of not less than 100° C. as measured according to ASTM D648 under 18.6 kg/cm$^2$ load,, and the product of the bending modulus and the damping ratio being not less than 10,000 MPa.%.

DETAILED DESCRIPTION OF THE INVENTION

Figure 1:
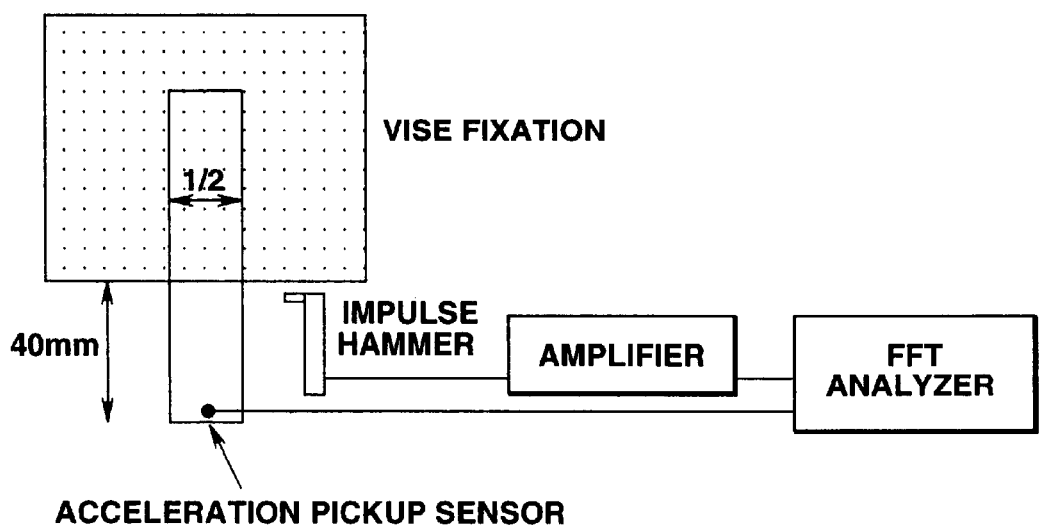
FIG. 1 is a schematic illustration of a damping ratio measuring device.

The term "OA machines" used in the present invention refers to the business machines such as copiers, facsimiles, printers, etc., as well as computer-related machines and devices, e.g. disc drives such as CD-ROM drive, DVD, FDD, HDD or the like. The "machine parts" refer to the structural parts of these machines and devices, and a typical example thereof is chassis.

The "polyphenylene ether-based resins" usable in the present invention may include polyphenylene ethers and mixtures of polyphenylene ethers and styrene resins.

The "polyphenylene ethers" usable in the present invention are the single polymers or copolymers having a structure represented by the following formula:

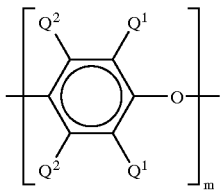

wherein Q1s are each a halogen atom, a primary or secondary alkyl group, an aryl group, an aminoalkyl group, a hydrocarbon oxy group or a halohydrocarbon oxy group; Q2s are each a hydrogen atom, a halogen atom, a primary or secondary alkyl group, an aryl group, a haloalkyl group, a hydrocarbon oxy group or a halohydrocarbon oxy group; and m is an integer not less than 10.

The preferred examples of the primary alkyl groups represented by Q1 and Q2 are methyl, ethyl, n-propyl, n-butyl, n-amyl, isoamyl, 2-methylbutyl, n-hexyl, 2,3-dimethylbutyl, and 2-, 3- or 4-methylpentyl or heptyl. The preferred examples of the secondary alkyl groups represented by Q1 and Q2 are isopropyl, sec-butyl and 1-ethylpropyl. In more preferable cases, Q1 is an alkyl group or a phenyl group, especially an alkyl group having 1 to 4 carbon atoms, and Q2 is a hydrogen atom.

The polyphenylene ether single polymers used in the present invention are preferably those comprising 2,6-dimethyl-1,4-phenylene ether units, and the copolymers are preferably the random copolymers comprising a combination of the said units and 2,3,6-trimethyl-1,4-phenylene ether units. Many preferred single polymers and random copolymers are described in the patents and literature. The polyphenylene ethers having a molecular structural portion which improves the polymer properties such as molecular weight, melt viscosity and/or impact resistance, are also preferred.

The polyphenylene ether used in the present invention is preferably the one having an intrinsic viscosity of 0.2 to 0.8 dl/g, more preferably 0.2 to 0.7 dl/g, still more preferably 0.25 to 0.6 dl/g, as measured at 30° C. in chloroform. When its intrinsic viscosity is less than 0.2 dl/g, the produced composition may be poor in impact resistance, and when the intrinsic viscosity exceeds 0.8 dl/g, the composition may be unsatisfactory in moldability.

The term "polycarbonate-based resins" used in the present invention refers to the polycarbonate resins which may or may not contain styrene resins. Examples of the polycarbonate resins usable in the present invention may include aromatic polycarbonates, aliphatic polycarbonates, and aliphatic-aromatic polycarbonates. Of these resins, the aromatic polycarbonates comprising bisphenols, such as 2,2-bis(4-oxyphenyl)alkane-based, bis(4-oxyphenyl)ether-based and bis(4-oxyphenyl)sulfone-, sulfide- or sulfoxide-based resins are preferred. The polycarbonate resins comprising halogen-substituted bisphenols may be used, if necessary.

The polycarbonate used in the present invention is not restricted in its molecular weight, but usually it has a molecular weight of not less than 10,000, preferably 20,000 to 40,000.

The styrene-based resins usable in the present invention are the copolymers comprising the aromatic vinyl compound repeating units represented by the formula:

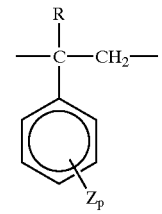

wherein R is hydrogen, an alkyl group having 1 to 4 carbon atoms, or a halogen; Z is hydrogen, an alkyl group having 1 to 4 carbon atoms, a halogen or a vinyl group; and p is an integer of 1 to 5, and other copolymerizable monomers containing not less than 50% by weight of said repeating units.

Examples of such copolymers may include polystyrenes, poly-α-methylstyrene, rubber-reinforced polystyrenes, styrene-acrylonitrile copolymer, styrene-acrylonitrile-α-alkylstyrene copolymer, acrylonitrile-butadiene-styrene copolymer, acrylonitrile-butadiene-α-methylstyrene copolymer, styrene-maleic anhydride copolymer, and styrene-maleimide copolymer.

Rubber-reinforced polystyrenes can be formed by using as rubber reinforcement diene rubber, isoprene rubber, styrene-butadiene rubber, styrene-isoprene rubber, acrylic rubber, ethylene-propylene rubber, ethylene-octene rubber, EPDM rubber or the like.

Of these copolymers, polystyrenes, rubber-modified polystyrenes, acrylonitrile-styrene copolymer, acrylonitrile-butadiene-styrene copolymer and mixtures thereof are especially preferred.

The amount of a styrene-based resin contained in a polyphenylene ether-based resin is preferably 0 to 90% by weight, more preferably 1 to 70% by weight, still more preferably 2 to 50% by weight based on the sum of polyphenylene ether and styrene-based resin. When the content exceeds 90% by weight, the produced composition may be low in heat resistance.

In the case of the polycarbonate-based resins, the styrene-based resin content is preferably 0 to 50% by weight, more preferably 1 to 45% by weight, even more preferably 5 to 40% by weight based on the sum of polycarbonate resin and styrene-based resin. When the content exceeds 50% by weight, the produced composition may be low in heat resistance.

It is also preferable to contain an inorganic filler in the resin composition of the present invention. Any type of inorganic filler generally used in the thermoplastic resins can be used in the present invention. Examples of the inorganic fillers usable in the present invention may include fibrous fillers such as glass fiber, carbon fiber and metal fiber, whiskers such as potassium titanate whisker, magnesium sulfate whisker, aluminum borate whisker, calcium carbonate whisker, silicon carbide whisker, zinc oxide whisker and wollastrite, plate-like fillers such as mica, talc and glass flakes, and granular fillers such as calcium carbonate, clay, kaolin, barium sulfate, silica, alumina, magnesium oxide, magnesium sulfate, metallic powder, glass beads and glass powder. These fillers may be used either singly or as a mixture of two or more of them according to the purpose of use of the produced molding material. Also, these fillers may be surface treated with various types of coupling agent to improve their adhesiveness to the resin.

The content of the inorganic filler in the composition is usually 0 to 60% by weight, preferably 5 to 55% by weight, more preferably 10 to 50% by weight based on the weight of molding material. In case where applications require a high modulus of elasticity, a too small filler content may be not preferred. When the filler content exceeds 60 parts by weight, the obtained composition may be deteriorated affected in impact strength, resulting in poor moldability of the composition.

It is preferred that the filler comprises not less than 10% by weight, preferably not less than 20% by weight of glass fiber. In case where the resin composition contains glass fiber in the above-mentioned amount, the molding product comprising the resin composition has higher impact strength and higher rigidity in comparison with the case of a resin composition containing only mica as the inorganic filler.

In the present invention, a thermoplastic elastomer is added for the purpose of improving vibration damping properties of the molding material. The thermoplastic elastomers usable for the said purpose in the present invention may include conjugated diene rubbers such as butadiene rubber and isoprene rubber, styrene-conjugated diene block copolymers and their hydrogenation products, ethylene-α-olefin copolymer rubber, nylon elastomers, polyester elastomers, urethane elastomers, silicon elastomers, fluorine elastomers, and core-shell type elastomers. Of these elastomers, conjugated diene rubbers, styrene-conjugated diene block copolymers and their hydrogenation products are preferred, and those of the conjugated diene rubbers containing not less than 50% by weight of the structural units having a 1,2-vinyl and/or 3,4-vinyl structure, those of the styrene-conjugated diene block copolymers containing not less than 50% by weight of the structural units having a 1,2-vinyl and/or 3,4-vinyl structure, and their hydrogenation products are especially preferred. It is preferable to introduce into these elastomers a functional group having affinity for or reactivity with polyphenylene ether-based or polycarbonate-based resins for the purpose of improving affinity of the composition for such resins. The elastomers used in the present invention preferably have a DSC-determined glass transition temperature between −30 and 50° C., more preferably between −20 and 30° C.

The amount of the thermoplastic elastomer blended is 2 to 40 parts by weight, preferably 3 to 28 parts by weight, more preferably 5 to 25 parts by weight based on 100 parts by weight of the resin components of the composition. On the other hand, the amount of polyphenylene ether-based or polycarbonate-based resin is 60 to 98 parts by weight, preferably 72 to 97 parts by weight, more preferably 75 to 95 parts by weight based on 100 parts by weight of the resin components of the composition. The total amount of polyphenylene ether-based or polycarbonate-based resin and thermoplastic elastomer is 100 parts by weight. If the amount of the thermoplastic elastomer is less than 2 parts by weight, the improvement of vibration damping properties may not be obtained, while if its amount exceeds 40 parts by weight, the modulus of elasticity of the composition may lower excessively.

As other components of the composition of the present invention, it is possible to add the materials commonly used for the thermoplastic resin preparations, such as antioxidant, weathering resistance improver, nucleating agent, impact resistance improver, plasticizer, fluidity improver, etc. Known types of colorants and their dispersants can also be used for enhancing practicality of the composition.

It is further possible to add other types of thermoplastic resins such as polyolefins, polyamides, polyesters, polyarylene sulfide, etc., within limits not prejudicial to the intended effect of the present invention. The amount of these resins added, but it is preferable that the amount of the other thermoplastic resins is 0 to 30 parts by weight based on the total amount (100 parts by weight) of the polyphenylene ether-based or polycarbonate-based resin and the thermoplastic elastomer.

The resin composition according to the present invention essentially contains a flame retardant. As the flame retardant, various known types of flame retardant can be used in the present invention and there are exemplified halogen-type flame retardants such as bromine-type flame retardants, chlorine-type flame retardants and fluorine-type flame retardants, antimony-type flame retardants, phosphorus-type flame retardants and nitrogen-type flame retardants. Of these, halogen-type flame retardants and phosphorus-type flame retardants are preferably used.

As the halogen-type flame retardant, bromine-type flame retardant is preferred, especially, the bromine-type flame retardant comprising a bromine substituted-aromatic compound is preferred in view of heat resistance. As the bromine substituted-aromatic compound, there are exemplified brominated bisphenol "A", epoxy resins made from brominated bisphenol "A"s as the starting material, polycarbonates resins made from brominated bisphenol A as the starting material, brominated polystyrenes and brominated polyphenylene ether.

The amount of the halogen-type flame retardant in the resin composition is 1 to 50 parts by weight, preferably 1 to 30 parts by weight, more preferably 1 to 20 parts by weight based on the total amount (100 parts by weight) of the polyphenylene ether-based or polycarbonate-based resin and the thermoplastic elastomer. When the amount of the halogen-type flame retardant is less than 1 part by weight, the flame retardancy may not be sufficient. When the amount of the halogen-type flame retardant is more than 50 parts by weight, the residence heat stability in the molding process may be deteriorated. It is preferable that the halogen-type flame retardant is used in combination of antimony compounds such as antimony trioxide, antimony tetraoxide and sodium antimonate, as the flame-retardant assistant. The amount of the flame-retardant assistant used is usually ½ to $\frac{1}{10}$ amount of the weight of the halogen-type flame retardant.

As the phosphorus-type flame retardant, phosphates and red phosphorus are preferred. Of these, phosphates, especially aromatic phosphates are preferred. As the aromatic phosphates, there are exemplified mono-phosphates such as triphenyl phosphate, tricrezyl phosphate and trixylyl phosphate, and condensed type aromatic phosphates having a residue of aromatic dialcohol such as bisphenol A, resorcinol, hydroquinone and biphenol. The condensed type aromatic phosphates are easily available as the commercial products such as CR733S and CR741 (produced by Daihachi Chemical Co., Ltd.), and FP500 (Asahi Denka Kogyo KK).

The amount of the phosphate as the flame retardant in the resin composition is 1 to 50 parts by weight, preferably 3 to 40 parts by weight, more preferably 5 to 30 parts by weight based on the total amount (100 parts by weight) of the polyphenylene ether-based or polycarbonate-based resin and the thermoplastic elastomer. When the amount of the phosphate is less than 1 part by weight, the flame retardancy may not be sufficient. When the amount of the phosphate is more than 50 parts by weight, the residence heat stability in the molding process may be deteriorated.

In the resin composition according to the present invention, it is preferred that an anti-drip agent is used in combination of the flame-retardant. As the anti-drip agent, fluorine compounds such as polytetrafluoroethylene are preferred. The amount of the fluorine compounds as the anti-drip agent is usually 0.01 to 2 parts by weight, preferably 0.05 to 1.5 parts by weight, especially preferably 0.1 to 1 part by weight based on the total amount (100 parts by weight) of the polyphenylene ether-based or polycarbonate-based resin and the thermoplastic elastomer.

In the present invention, the molding material comprising the resin composition has a flammability (flame-retardant property) of usually V-0, V-1 or V-2 rank, preferably V-0 or V-1 rank, especially preferably V-0 rank according to UL94 vertical combustion test in which the specimen thickness is 1.6 mm. This flammability rank (V-0, V-1 or V-2) is required in a molding material for OA machine parts.

It is essential for the molding material for OA machine parts with excellent vibration damping properties according to the present invention that the properties of their thermoplastic resin composition satisfy the following requirements.
(1) The bending modulus measured at 23° C. according to ASTM D790 is not less than 1,500 MPa, preferably not less than 2,000 MPa, more preferably not less than 2,800 MPa. If the bending modulus is less than 1,500 MPa, the composition may lack rigidity and be not preferred for OA machines parts.
(2) The damping ratio at 23° C. is not less than 1.0%, preferably not less than 1.5%. When the damping ratio is less than 1.0%, the composition may lack preferred vibration damping performance. The damping ratio shown here is the one at a primary natural frequency, which can be determined by giving vibrations, with an impulse hammer, to a test piece to which an acceleration pickup sensor is attached, and making calculations from the signals from the pick up sensor and the force sensor attached to the impulse hammer (see FIG. 1).
(3) The thermal deformation temperature as measured according to ASTM D648 under 18.6 $kg/cm^2$ is not less than 100° C., preferably not less than 110° C. When the thermal deformation temperature is less than 100° C., the composition may be subject to deformation by the heat in use and, therefore, not preferable for OA machine parts.
(4) The product of bending modulus and damping ratio is not less than 10,000 MPa, preferably not less than 11,000 MPa, more preferably not less than 12,000 MPa. Bending modulus and damping ratio are in a conflicting relation to each other, and when their product is less than 10,000 MPa, they are poorly balanced and preferred for OA machine parts.

Methods for production and molding of the composition are explained below.

Various methods are available for obtaining the thermoplastic resin composition of the present invention. In one method, for instance, the above-mentioned components are mixed and kneaded by various types of mixer such as single- or multi- screw mixer, Banbury mixer, roll mixer, Brabender Plastogram or the like, and then cooled and solidified. In another method (dissolution mixing method), the said components are added to a preferable solvent, for example, a hydrocarbon such as hexane, heptane, benzene, toluene and xylene or a derivative thereof, and the dissolved components or the dissolved and undissolved components are mixed in a suspended state. The former (mixing and kneeding) method is preferred from the viewpoint of industrial cost.

The molding method for the molding material for OA machine parts with excellent vibration damping properties according to the present invention is not specified, but it is possible to apply the methods generally used for molding of thermoplastic resin compositions, such as injection molding, hollow molding, extrusion molding, sheet molding, heat forming, rotational molding and laminate molding.

As is apparent from the foregoing embodiments, the molded products according to the present invention have improved vibration damping properties and flame-retardant property in addition to high mechanical strength, heat resistance and dimensional accuracy, and are preferred for application to OA machine parts for which the requirement for vibration damping properties is expected to become stronger in the future.

EXAMPLES

The present invention is further illustrated by showing the examples thereof, but the invention is not limited to these examples.

The following materials were used as components of the composition.
1. Polyphenylene ether (PPE): poly(2,6-dimethyl-1,4-phenylene ether) (intrinsic viscosity measured in chloroform at 30° C.=0.40 dl/g, produced by Mitsubishi Gas Chemical Co., Ltd.)
2. Polycarbonate resin (PC): bisphenol A-polycarbonate (trade name: IUPIRON S3000, viscosity-average molecular weight=21,000, produced by Mitsubishi Engineering-Plastics Corporation)
3. Xylon 500H: modified PPE resin based on poly(2,6-dimethyl-1,4-phenylene)ether (density=1.06)
4. Styrene-based resins
   PS-1: polystyrene (trade name: DIAREX HF77, produced by Mitsubishi Chemical Corporation)
   PS-2: rubber-reinforced polystyrene (trade name: DIAREX HT 478, produced by Mitsubishi Chemical Corporation)
   ABS: acrylonitrile-butadiene-styrene copolymer (trade name: SANTAC UT60B, produced by Mitsui Chemical Co., Ltd.)
5. Thermoplastic elastomers
   HYBRAR: styrene-isoprene block copolymer (trade name: HYBRAR VS-1, produced by Kuraray Co., Ltd.; proportion of the structural units having a 1,2-vinyl and/or 3,4-vinyl structure=70 wt %; glass transition point=8° C.)
   KRATON: hydrogenated styrene-butadiene-styren block copolymer trade name: KRATON G1651, produced by Shell Chemical Co.; proportion of the structural units having a 1,2-vinyl and/or 3,4-vinyl structure=[0 wt %] about 30–40 wt %; glass transition point=−60° C.)
6. Flame-retardant
   TPP: triphenyl phosphate
   Br-PC: tetrabromobisphenol A-polycarbonate oligomer (trade name: IUPIRON FR53, produced by Mitsubishi Engineering-Plastics Corporation)
   PTFE: polytetrafluoroethylene (trade name: POLYFLON F201, produced by Daikin Industries Co., Ltd.)
7. Inorganic fillers
   Glass fiber: E-glass fiber having an average diameter of 10 $\mu$m and a length of 3 mm
   Glass flakes: trade name: REFG-101, produced by Nippon Sheet Glass Co., Ltd.
   Mica: average particle size=50 $\mu$m The properties of the products were evaluated by the following methods.
(1) Izod Impact Test
A notched izod impact test was carried out according to ASTM D256.
In the present invention, the izod impact is preferably not less than 30 J/m.

(2) Bending Modulus

A three-point bending test was conducted according to the bending test method of ASTM D790.

In the present invention, the bending modulus is preferably not less than 1500 MPa.

(3) Thermal Deformation Temperature

A deformation-under-load test was carried out under the condition of 18.6 kg/cm² according to ASTM D648.

In the present invention, the thermal deformation temperature is preferably not less than 80° C.

(4) Damping Ratio

An ASTM test piece (½"×¼") made under the above-described conditions was fixed by a bias as shown in FIG. 1, and an acceleration pickup sensor was attached to an end of the test piece. Then the test piece was hit by an impulse hammer (GK3100 mfd. by Ono Sokuki KK) to let it vibrate, and the signals form the pickup and the force sensor attached to the impulse hammer were input to an FFT analyzer (CF-350Z mfd. by Ono Sokuki KK) to determine the transfer function G(t) of the material.

$$G(t)=X(t)/F(t)$$

X(t): output signal

F(t): input signal

The damping ratio at the primary natural frequency was calculated from the determined transfer function G(t) according to the half-value width method.

In the present invention, the damping ratio is preferably not less than 1.0%.

(5) Dimensional Accuracy

Using an in-line injection molder (clamping force: 100 T), a 100 mm×100 mm×2 mm thick flat plate was made by injection molding with a film gate, and the clearance was measured on a platen to determine warpage. Cylinder and mold temperatures were as follows.

Cylinder Temperature

280° C.: in Examples 1–5 and Comparative Examples 1–4, 7 and 9–10

220° C.: in Comparative Examples 5–6 and 15

300° C.: in Reference Examples 1–2, Example 6 and Comparative Examples 11–13

270° C.: in Reference Example 3, Example 7 and Comparative Example 14

260° C.: in Comparative Example 8 and 16

Mold Temperature

60° C.: in Examples 1–5 and Comparative Examples 1–4, 7 and 9–10

40° C.: in Comparative Examples 5–6 and 15

80° C.: in Examples 6–7, Comparative Examples 8, 11–14 and 16, and Reference Examples 1–3

In the present invention, the warpage is preferably not more than 3.0 mm.

(6) MFR

Measured under the conditions of 280° C. and 5 kg according to ASTM D1238.

In the present invention, the MFR is preferably 0.5 to 100 g/10 min.

(7) Flammability (Flame-retardant Property)

According to the method prescribed in UL94 vertical combustion test, a test specimen having a thickness of 1.6 mm. In the present invention, flammability is preferably V-0, V-1 or V-2, more preferably V-0 or V-1, especially preferably V-0.

Examples 1–5 and Comparative Examples 1–7 and 9–10

The materials shown in Table 1 were blended in the ratios also shown in Table 1 using a twin-screw extruder (mfd. by Japan Steel Works, Ltd.) at a cylinder temperature of 210° C. and a screw speed of 250 rpm to obtain the resin compositions. These resin compositions were injection molded to make the test pieces using an in-line injection molding machine (clamping force: 50 T) under the conditions of cylinder temperature of 280° C. and mold temperature of 60° C., and the test pieces were evaluated by the methods explained above. The results are shown in Table 1.

In Comparative Examples 5 and 6, the injection molding machine was operated at a cylinder temperature of 220° C. and a mold temperature of 40° C.

Comparative Example 8

A 30% glass fiber-reinforced PBT (NOVADUR 5010GN1-30, produced by Mitsubishi Engineering-Plastics Corporation) was injection molded to make a test piece using an in-line injection molding machine (clamping force: 50 T) under the condition of cylinder temperature of 255° C. and mold temperature of 80° C., and the test piece was evaluated by the above-described methods. The results are shown in Table 1.

TABLE 1

|  | Example 1 | Example 2 | Example 3 | Example 4 | Example 5 | Comp Example 1 | Comp. Example 2 | Comp. Example 3 | Comp. Example 4 | Comp. Example 5 | Comp. Example 6 | Comp. Example 7 |
|---|---|---|---|---|---|---|---|---|---|---|---|---|
| Composition |  |  |  |  |  |  |  |  |  |  |  |  |
| PPE (parts by weight) | 60 | 55 | 75 | 75 | 90 | 60 | 40 | 75 | 60 | 20 | — | 75 |
| PS-1 (parts by weight) | 20 | 25 | 5 | 5 | — | 40 | — | 25 | 20 | 60 | 80 | 5 |
| Thermoplastic elastomer |  |  |  |  |  |  |  |  |  |  |  |  |
| HYBRAR (parts by weight) | 20 | 20 | 20 | 20 | 10 | — | 60 | — | 20 | 20 | 20 | — |
| KRATON (parts by weight) | — | — | — | — | — | — | — | — | — | — | — | 20 |
| TPP (parts by weight) | 12 | 12 | 17 | 17 | 20 | 12 | 12 | 17 | — | 12 | — | 17 |
| Inorganic filler |  |  |  |  |  |  |  |  |  |  |  |  |
| Glass fiber (wt %) | — | — | 30 | 25 | 20 | — | — | 30 | 20 | — | — | 25 |
| Mica (wt %) | — | 15 | — | 15 | 15 | — | — | — | 15 | — | — | 15 |

TABLE 1-continued

| Properties | | | | | | | | | | | | |
|---|---|---|---|---|---|---|---|---|---|---|---|---|
| Izod impact strength (J/m) | 100 | 45 | 105 | 95 | 100 | 15 | 200 | 80 | 100 | 70 | 20 | 115 |
| Bending modulus (MPa) | 2300 | 3100 | 7200 | 9000 | 8300 | 3000 | 700 | 7800 | 2200 | 2400 | 2200 | 8700 |
| Thermal deformation temperature (° C.) | 105 | 105 | 130 | 130 | 125 | 102 | 80 | 115 | 140 | 55 | 60 | 128 |
| Damping ratio | 5.1 | 4.0 | 2.3 | 1.9 | 1.6 | 2.1 | 10.2 | 0.8 | 5.0 | 4.7 | 4.9 | 0.7 |
| Bending modulus × damping ratio (MPa) | 11730 | 12400 | 16560 | 17100 | 13280 | 6300 | 7140 | 6240 | 11000 | 11280 | 10780 | 6090 |
| MFR (g/10 min) | 14 | 12 | 5 | 4 | 1 | 20 | 9 | 7 | 3 | 45 | 80 | 5 |
| Warpage (mm) | 0.5 | 0.5 | 2.0 | 1.5 | 0.4 | 0.5 | 1.5 | 2.0 | 0.5 | 0.6 | 1.5 | 1.6 |
| Flammability | V-1 | V-1 | V-0 | V-0 | V-0 | V-1 | V-1 | V-0 | no good | no good | no good | V-0 |

| | Comp. Example 8 | Comp. Example 9 | Comp. Example 10 |
|---|---|---|---|
| Composition | | | |
| PPE (parts by weight) | — | — | — |
| PS-1 (parts by weight) | — | — | — |
| Xylon 500H (parts by weight) | — | 70 | 70 |
| Thermoplastic elastomer | | | |
| HYBRAR (parts by weight) | — | 30 | 30 |
| KRATON (parts by weight) | — | — | — |
| TPP (parts by weight) | — | — | — |
| Inorganic filler | | | |
| Glass fiber (wt %) | — | — | — |
| Mica (wt %) | — | — | 38 |
| Properties | | | |
| Izod impact strength (J/m) | 95 | 300 | 40 |
| Bending modulus (MPa) | 8500 | 1300 | 6000 |
| Thermal deformation temperature (° C.) | 205 | 90 | 95 |
| Damping ratio | 0.6 | 6.0 | 2.0 |
| Bending modulus × damping ratio (MPa) | 5100 | 7800 | 12000 |
| MFR (g/10 min) | 80 | 20 | 10 |
| Warpage (mm) | 5.5 | 2.5 | 1.3 |
| Flammability | V-0 | no good | no good |

Reference Examples 1–2, Example 6 and Comparative Examples 11–13

The materials shown in Table 2 were melt mixed in the ratios also shown in the table using a twin-screw extruder (mfd. by Japan Steel Works, Ltd.) at a cylinder temperature of 280° C. and a screw speed of 250 rpm to obtain the resin compositions. These resin compositions were injection molded to make the test pieces using an in-line injection molding machine (clamping force: 50 T) under the conditions of cylinder temperature of 300° C. and mold temperature of 80° C., and the test pieces were evaluated in the manner described above. The results are shown in Table 2.

Reference Example 3, Example 7 and Comparative Example 14

The materials shown in Table 2 were melt mixed by a twin-screw extruder (mfd. by Japan Steel Works, Ltd.) at a cylinder temperature of 250° C. and a screw speed of 250 rpm to obtain the resin compositions. These resin compositions were injection molded to make the test pieces using an in-line injection molding machine (clamping force: 50 T) at a cylinder temperature of 270° C. and a mold temperature of 80° C., and the test pieces were evaluated in the manner described above. The results are shown in Table 2.

Comparative Example 15

The materials were melt mixed in the ratios shown in Table 2 using a twin-screw extruder (mfd. by Japan Steel Works, Ltd.) at a cylinder temperature of 2500C and a screw speed of 250 rpm to obtain a resin composition. This resin composition was injected molded to make a test piece using an in-line injection molding machine (clamping force: 50 T) under the conditions of cylinder temperature of 220° C. and mold temperature of 40° C., and the test piece was evaluated in the manner described above. The results are shown in Table 2.

Comparative Example 16

A 30% glass fiber-reinforced PBT (trade name: NOVA-DUR 5010GN-1-30, produced by Mitsubishi Engineering-Plastics Corporation) was injection molded to make a test piece using an in-line injection molding machine (clamping force: 50 T) under the conditions of cylinder temperature of 255° C. and mold temperature of 80° C., and the test piece was evaluated in the manner described above. The results are shown in Table 2.

TABLE 2

| | Ref. Example 1 | Ref. Example 2 | Example 6 | Ref. Example 3 | Example 7 | Comp. Example 11 | Comp. Example 12 | Comp. Example 13 | Comp. Example 14 | Comp. Example 15 | Comp. Example 16 |
|---|---|---|---|---|---|---|---|---|---|---|---|
| Composition | | | | | | | | | | | |
| PC (parts by weight) | 80 | 80 | 80 | 63 | 63 | 100 | 40 | 80 | 70 | — | (PBT) |
| Styrene resin | | | | | | | | | | | |
| PS (parts by weight) | — | — | — | — | 27 | — | — | — | — | 80 | — |
| ABS (parts by weight) | — | — | — | 27 | — | — | — | — | 30 | — | — |
| Thermoplastic elastomer | | | | | | | | | | | |
| HYBRAR (parts by weight) | 20 | 20 | 20 | 10 | 10 | — | 60 | — | — | 20 | — |
| KRATON (parts by weight) | — | — | — | — | — | — | — | 20 | — | — | — |
| Flame retardant | | | | | | | | | | | |
| Br-PC (parts by weight) | — | — | 10 | — | 15 | — | — | — | — | — | — |
| PTFE (parts by weight) | — | — | 0.3 | — | 0.3 | — | — | — | — | — | — |
| Inorganic filler | | | | | | | | | | | |
| Glass fiber (wt %) | — | 30 | 10 | 30 | 30 | — | — | 30 | 30 | — | 30 |
| Glass flakes (wt %) | — | — | 20 | — | — | — | — | — | — | — | — |
| Properties | | | | | | | | | | | |
| Izod impact strength (J/m) | 600 | 96 | 52 | 82 | 76 | 780 | 700 | 94 | 96 | 20 | 95 |
| Bending modulus (MPa) | 1950 | 6200 | 5400 | 6800 | 6700 | 2300 | 700 | 6100 | 7400 | 2200 | 8500 |
| Thermal deformation temperature (° C.) | 132 | 144 | 140 | 128 | 124 | 138 | 80 | 140 | 131 | 60 | 205 |
| Damping ratio | 5.3 | 2.2 | 2.3 | 1.5 | 1.6 | 2.1 | 10.4 | 0.7 | 0.7 | 4.9 | 0.6 |
| Bending modulus × damping ratio (MPa) | 10335 | 13640 | 12420 | 10200 | 10720 | 4830 | 7280 | 4270 | 5180 | 10780 | 5100 |
| Warpage (mm) | 0.4 | 1.8 | 0.4 | 2.0 | 2.1 | 0.4 | 1.5 | 1.9 | 2.2 | 1.5 | 5.5 |
| Flammability | no good | no good | V-0 | no good | V-0 | no good | no good | no good | no good | no good | V-0 |

What is claimed is:

1. A molding material for OA machine parts comprising a resin composition comprising:

(1) 60 to 98 parts by weight of a polyphenylene ether-based resin comprising 10 to 100% by weight of a polyphenylene ether resin and 0 to 90% by weight of a styrene-based resin;

(2) 2 to 40 parts by weight of a thermoplastic elastomer which is a conjugated diene rubber having not less than 50% by weight of addition across a 1,2-vinyl structure, addition across a 3,4-vinyl structure or mixture thereof, a styrene-conjugated diene block copolymer having not less than 50% by weight of addition across a 1,2-vinyl structure, addition across a 3,4-vinyl structure or mixture thereof, or a hydrogenated product thereof;

(3) 1 to 50 parts by weight of a flame retardant, the total amount of (1) polyphenylene ether-based and (2) thermoplastic elastomer being 100 parts by weight; and (4) glass fiber in an amount of 10 to 60% by weight based on the weight of molding material, said resin composition having bending modulus of not less than 1500 MPa as measured at 23° C. according to ASTM D790, a damping ratio of not less than 1.0% at 23° C., and a thermal deformation temperature of not less than 100° C. as measured according to ASTM D648 under 18.6 kg/cm$^2$ load, and the product of the bending modulus and the damping ratio being not less than 10,000 MPa·%.

2. The molding material according to claim 1, wherein the glass transition temperature of the thermoplastic elastomer as measured by DSC is −30 to 50° C.

3. The molding materials according to claim 1, wherein the amount of (1) polyphenylene ether-based resin is 72 to 97 parts by weight and the amount of (2) thermoplastic elastomer is 3 to 28 parts by weight.

4. The molding material according to claim 1, having a flammability of V-0, V-1 or V-2 rank according to UL94 vertical combustion test in which the specimen thickness is 1.6 mm.

5. The molding material according to claim 1, wherein the flame retardant is a halogen-type flame retardant or phosphorus-type flame retardant.

6. The molding material according to claim 5, wherein the halogen-type flame retardant is a bromine-type flame retardant.

7. The molding material according to claim 5, wherein the phosphorus-type flame retardant is a phosphate.

* * * * *